United States Patent
Ando (10) Patent No.: US 7,274,863 B2
(45) Date of Patent: Sep. 25, 2007

(54) DATA STREAM PROCESSING DEVICE AND METHOD AND PROGRAM STORAGE MEDIUM

(75) Inventor: Yuji Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1187 days.

(21) Appl. No.: 10/110,224

(22) PCT Filed: Aug. 13, 2002

(86) PCT No.: PCT/JP01/07158

§ 371 (c)(1),
(2), (4) Date: Aug. 31, 2002

(87) PCT Pub. No.: WO02/17568

PCT Pub. Date: Feb. 28, 2002

(65) Prior Publication Data

US 2003/0053795 A1    Mar. 20, 2003

(30) Foreign Application Priority Data

Aug. 21, 2000    (JP) .............................. 2000-249761

(51) Int. Cl.
*H04N 7/26* (2006.01)
*H04N 5/76* (2006.01)

(52) U.S. Cl. ......................................... 386/112; 386/68

(58) Field of Classification Search .................. 386/68, 386/81, 111, 112
See application file for complete search history.

(56) References Cited

U.S. PATENT DOCUMENTS 6,031,960 A * 2/2000 Lane ........................... 386/68
6,069,902 A * 5/2000 Kurano et al. .............. 370/535

FOREIGN PATENT DOCUMENTS

| JP | 11-73729 | 3/1999 |
| JP | 11-355294 | 12/1999 |
| JP | 2000-173181 | 6/2000 |

* cited by examiner

*Primary Examiner*—Thai Q. Tran
*Assistant Examiner*—Nigar Chowdhury
(74) *Attorney, Agent, or Firm*—Oblon, Spivak, McClelland, Maier & Neustadt, P.C.

(57) ABSTRACT

The present invention provides a data stream processing apparatus which records a data stream supplied via a network. An MPEG2 partial TS and channel bandwidth information are read from a recording medium, and a bandwidth of an IEEE 1394 serial data bus is secured on the basis of the read channel bandwidth information. MPEG2-TS packets read out are buffered and time stamps are generated based on PCR decoded for a period of the buffering. Subsequently, a head having stored therein a time stamp is appended to each of the MPEG2-TS packets to generate a source packet and the source packet is sent to the other electronic device by the use of the secured channel bandwidth of the IEEE 1394 serial data bus.

15 Claims, 8 Drawing Sheets

DATA STREAM PROCESSING DEVICE AND METHOD AND PROGRAM STORAGE MEDIUM

TECHNICAL FIELD

The present invention relates to a data stream processing apparatus and method, and a program storage medium, and more particularly, to a data processing apparatus and method, and a program storage medium, suitable for use to record MPEG2 (Moving Picture Experts Group 2) partial transport streams and read out the MPEG2 partial transport streams for reproduction or transmission.

BACKGROUND ART

In the digital CS (communication satellite) broadcasting and digital BS (broadcasting satellite) broadcasting, AV signals of a plurality of programs (so-called broadcast program) are encoded by the MPEG2 method and subjected to time-division multiplexing to provide an MPEG2 transport stream (will be referred to as "MPEG2-TS" hereunder) which is sent as a broadcast signal.

Figure 1A:
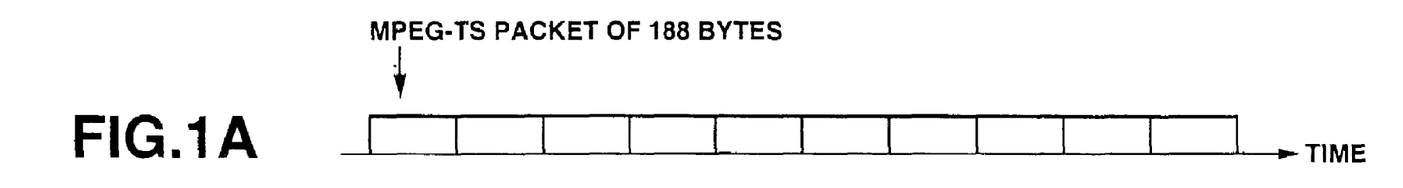
FIGS. 1A and 1B explain an MPEG2 partial TS multiplexed in an MPEG2-TS.
Figure 1B:
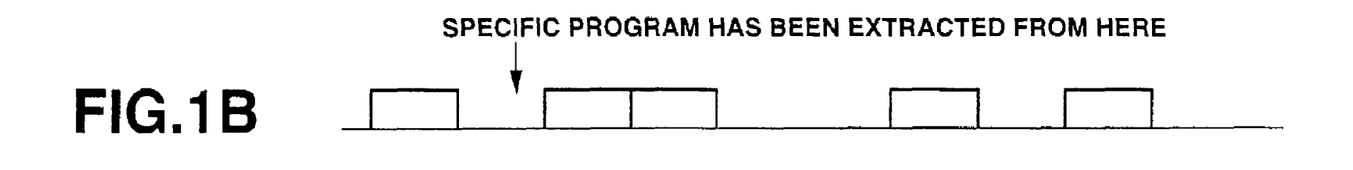

Referring now to FIGS. 1A and 1B, there is explained an MPEG2 partial TS multiplexed in an MPEG2-TS. Some of receivers such as a set top box (STB), which is adapted to receive such a broadcast signal, extracts, from a received MPEG2-TS as shown in FIG. 1A, an MPEG2 partial transport stream being data corresponding to an arbitrary program as shown in FIG. 1B, and sends it to another electronic device via an IEEE (Institute of Electrical and Electronic Engineers) 1394 serial data bus.

Note that an MPEG-TS has inserted therein repeatedly in a cycle of less than 100 msec a time stamp called "PCR (program clock reference)" for a decoder. A PCR includes a program_clock_reference_base and a program_clock_reference_extension, which are recorded in an adaptation field of an MPEG2-TS packet. The time stamp PCR indicates a time at which the last bit of the program_clock_reference_base has arrived. It is specified that the allowable error of the PCR arrival time should be ±500 nanoseconds, and that the PCR-defined system clock should be 27 MHz with a resolution of 300 ppm.

For transmission of an MPEG2 partial TS via the IEEE 1394 serial data bus, a method called "isochronous transfer" is used.

In the isochronous transfer, each of IEEE 1394 interfaces at the sending and receiving sides has a sync clock (cycle timer), and a time stamp generated based on the clock is appended to an MPEG2-TS packet to correct the timing of reception at the receiving side.

Figure 2:
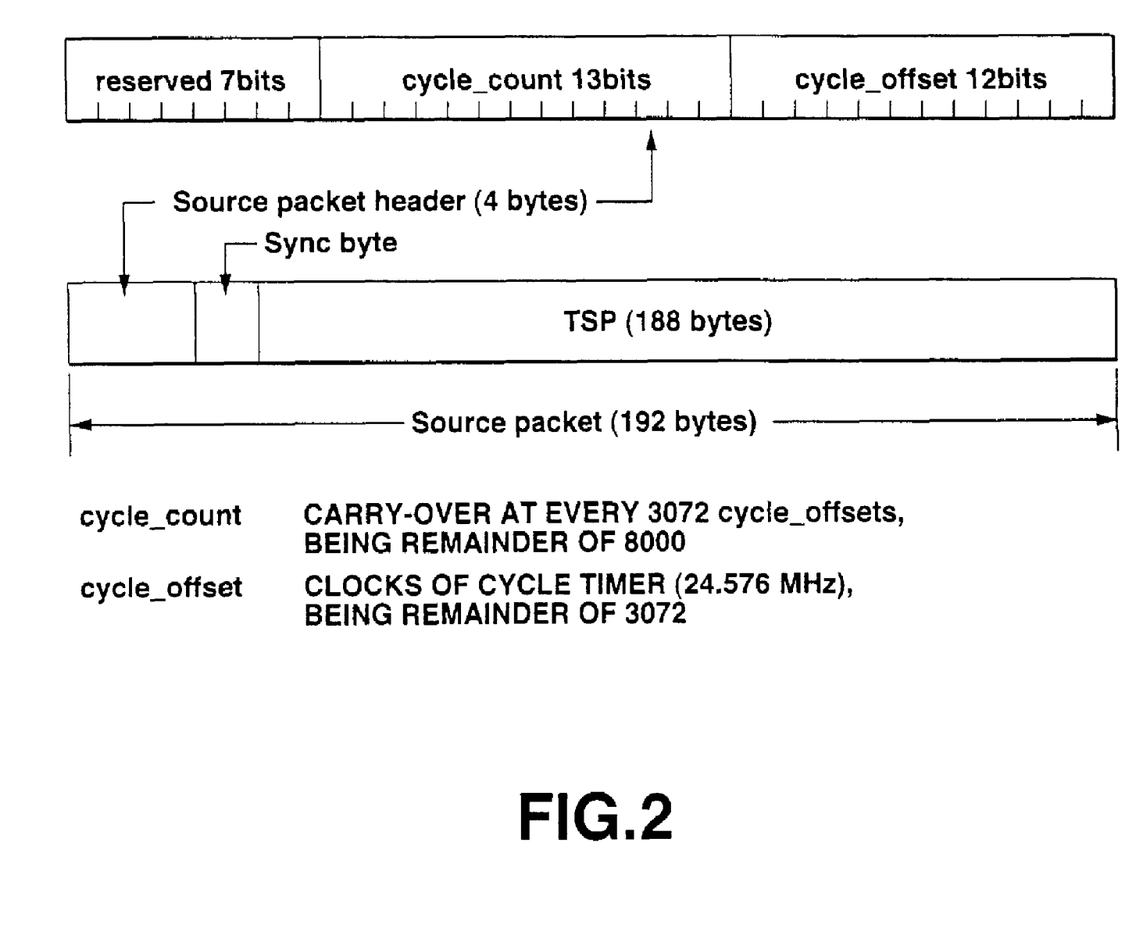
FIG. 2 shows a format of a source packet sent over an IEEE 1394 serial data bus.

FIG. 2 shows a format of a source packet consisting of a source packet header having a time stamp stored therein, a sync byte, and MEG2-TS packets. The time stamp is represented by a 13-bit cycle_count indicating a cycle timer and a 12-bit cycle_offset indicating a predetermined delay time, added to the cycle count.

FIGS. 3A to 3D show a time at which an MPEG2 partial TS is sent on the IEEE 1394 serial data bus.

Figure 3A:
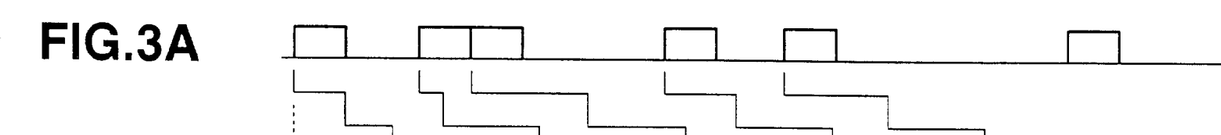
FIGS. 3A to 3D shows a timing of the source packet sent over the IEEE 1394 serial data bus.

As shown in FIG. 3A, an MGEP2 partial TS corresponding to a program extracted from the MPEG2-TS consists of MPEG2-TS packets laid at irregular intervals. A source packet header having stored therein a time stamp being a time counted by a cycle timer included in the IEEE 1394 interface at the sending side and to which a predetermined delay time is added, is appended to the MPEG2-TS packet to produce a source packet.

Figure 3B:
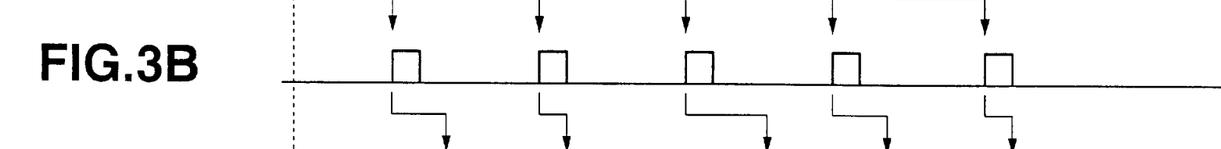
Figure 3C:
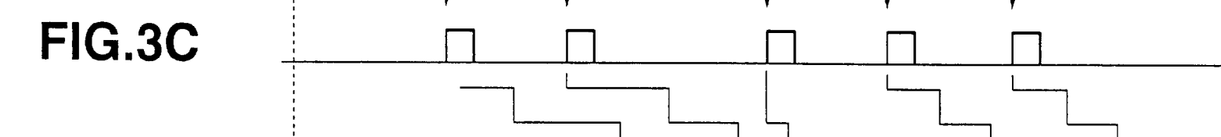

As shown in FIG. 3B, the source packets are sent at regular intervals from the sending side at times specified as in IEEE 1394. The source packets thus sent will be caused by a delay of transmission on the IEEE 1394 serial data bus or the like to arrive at the receiving side at irregular times as shown in FIG. 3C.

Figure 3D:
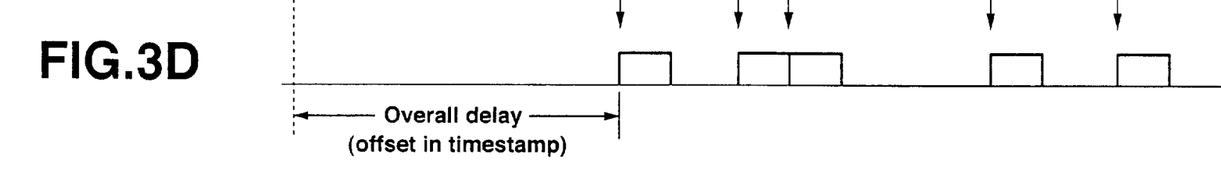

At the receiving side, however, since the source packets are stored in a smoothing buffer once, and then taken out at times specified by the time stamps, the MPEG2 partial TS shown in FIG. 3A is restored as shown in FIG. 3D.

Conventionally, an MPEG2 partial TS stored in each source packet and sent on the IEEE 1394 serial data bus as in the above, is received and recorded in a recording medium such as a magnetic tape, hard disc or the like. Also, such an MPEG2 partial TS is read out from the recording medium and sent on the IEEE 1394 serial data bus.

In the conventional apparatus, to reserve the timing of the original MPEG2 partial TS packet, the MPEG2 partial TS packet as well as a source packet header of a source packet having stored the MPEG2 partial TS packet are recorded in the recording medium, or a time stamp based on a clock which oscillates synchronously with the source packet header, a clock which oscillates synchronously with a PCR included in the MPEG2 partial TS or a clock which oscillates uniquely, is appended to the MPEG2 partial TS packet and recorded in the recording medium.

In a personal computer having a hard disc or in an AV hard disc recorder, for example, which can read bit streams at an arbitrary rate for decoding, the bit streams are read from the recording medium correspondingly to the extent of filling of the bit streams in a buffer incorporated in the decoder and thus bit streams will not overflow or underflow the buffer. Therefore, the MPEG2 partial TS packet have only to be timed for reproduction. Rather, in case timing information is recorded in the MPEG2 partial TS packet, a mechanism is required which removes the timing information and extracts only the MPEG2 partial TS packet.

On the other hand, to read an MPEG2 partial TS packet having timing information recorded therein for transmission on the IEEE 1394 serial data bus, a mechanism is required which restores the timing of the MPEG2 partial TS packet.

Conventionally, to restore the timing of the MPEG2 partial TS packet, there are required a mechanism which measures and records a time at which each MPEG2 partial TS packet has arrived, and a mechanism which restores original timing based on time stamps having been appended to the MEG2 partial TS packet at the time of reading and transmission. Also, the recording medium has to have a capacity for recording the time stamps.

Further, in some of the apparatuses including the above mechanisms for recording timing and restoring the recorded timing, an internal clock measures a time at which packets arrive and restores the timing. In case recording and reproduction are repeated with such apparatuses connected to each other, PCR errors will possibly be cumulated due to a difference in accuracy between the internal clock and PCR.

Furthermore, in case an MPEG2 partial TS is sent by an isochronous transfer on the IEEE 1394 serial data bus, a sufficiently broader band than a transport rate at which MPEG2-TS packets multiplexed in an MPEG2 partial TS corresponding to one program is secured on the IEEE 1394 serial data bus. However, the mean transport rate at which the MPEG2 partial TS is sent may be narrower than the secured sufficiently broad band, and also such a bandwidth of the IEEE 1394 serial data bus is uselessly wider since the MPEG2 partial TS is not sent at any constant transport rate.

DISCLOSURE OF THE INVENTION

It is therefore an object of the present invention to overcome the above-mentioned drawbacks of the prior art by recording an MPEG2 partial TS and reading out them for transmission on a predetermined data bus without having to use any mechanism which measures and records times at which the packets in the MPEG2 partial TS arrive.

The above object can be attained by providing a data stream processor which records a data stream supplied via a network, the apparatus including, means for receiving transmission packets having been supplied via the network and which correspond to the network, means for extracting data packets corresponding to a predetermined data stream from the transmission packets having been received by the receiving means, a first means for recording the data packets having been extracted by the extracting means into a recording medium, means for acquiring information on a bandwidth shared by the transmission packets in the network and a second means for correlating the bandwidth information having been acquired by the acquiring means with the data stream and recording it into the recording medium.

The above data stream processor according to the present invention may further include means for detecting the maximum value of a transport rate of the data stream, and the second recording means can be adapted to record the maximum value of the transport rate having been detected by the detecting means as bandwidth information into the recording medium.

Further, the above data stream processor may include means for restoring the data stream by the use of the data packets having been extracted by the extracting means, and means for decoding the data stream having been restored by the restoring means.

The above data stream processor according to the present invention may further include, a first means for reading data packets recorded in a recording medium, a second means for reading bandwidth information recorded in the recording medium, means for extracting time information from the data packets having been read by the first reading means, means for calculating time stamps corresponding to all the data packets, respectively, on the basis of the time information having been extracted by the extracting means, means for generating transmission packets corresponding to the network of the data packets with the time stamps appended thereto, means for securing a bandwidth of the network on the basis of the bandwidth information having been read by the second reading means and means for sending the transmission packets having been generated by the generating means to any other electronic device by utilizing the network bandwidth having been secured by the securing means.

In the above data stream processor, the above calculating means can have time stamps correspond to even time sections of a period between one piece of information and a next piece of information.

Also, the above object can be attained by providing a data stream processing method for use in a data stream processor which records a data stream supplied via a network, the method including, a step of receiving transmission packets having been supplied via the network and which correspond to the network, a step of extracting data packets corresponding to a predetermined data stream from the transmission packets having been received at the receiving step, a first step of recording the data packets having been extracted at the extracting step into a recording medium, a step of acquiring information on a bandwidth shared by the transmission packets in the network and a second step of correlating the bandwidth information having been acquired at the acquiring step with the data stream and recording it into the recording medium.

Also, the above object can be attained by providing a program storage medium for use to allow a data stream recorder to execute a data stream processing program for recording a data stream supplied via a network, the program including, a step of receiving transmission packets having been supplied via the network and which correspond to the network, a step of extracting data packets corresponding to a predetermined data stream from the transmission packets having been received at the receiving step, a first step of recording the data packets having been extracted at the extracting step into a recording medium, a step of acquiring information on a bandwidth shared by the transmission packets in the network and a second step of correlating the bandwidth information having been acquired at the acquiring step with the data stream and recording it into the recording medium.

Also, the above object can be attained by providing a data stream processor which reads a data stream from a recording medium and sends it to any other electronic device via a network, the apparatus including, a first means for reading data packets from the recording medium, a second means for reading bandwidth information from the recording medium, means for extracting time information from the data packets having been read by the first reading means, means for calculating times stamps corresponding to all the data packets on the basis of the time information having been extracted by the extracting means, means for generating transmission packets corresponding to the network of the data packets with the time stamps appended thereto, means for securing a bandwidth of the network on the basis of the bandwidth information having been read by the second reading means and means for sending the transmission packets having been generated by the generating means to the other electronic device by utilizing the network bandwidth having been secured by the securing means.

In the above data stream processor, the above calculating means can correlate time stamps with even time sections of a period between one piece of information and a next piece of information.

The above data stream processor may further include means for detecting the maximum value of a transport rate of the data stream, and the second recording means can be adapted to record the maximum value of the transport rate having been detected by the detecting means as bandwidth information into the recording medium.

Further, the above data stream processor may include means for restoring the data stream by the use of the data packets having been extracted by the extracting means, and means for decoding the data stream having been restored by the restoring means.

Also, the above object can be attained by providing a data stream processing method for use in a data stream processor which reads a data stream from a recording medium and sends it to any other electronic device via a network, the method including, a first step of reading data packets from the recording medium, a second step of reading bandwidth information from the recording medium, step of extracting time information from the data packets having been read at the first reading step, a step of calculating times stamps corresponding to all the data packets on the basis of the time information having been extracted at the extracting step, a step of generating transmission packets corresponding to the network of the data packets with the time stamps to them, a step of securing a bandwidth of the network on the basis of the bandwidth information having been read at the second reading step and a step of sending the transmission packets having been generated at the generating step to the other electronic device by utilizing the network bandwidth having been secured at the securing step.

Also, the above object can be attained by providing a program storage medium for use to allow a data stream recorder to execute a data stream processing program for recording a data stream supplied via a network, the program including, a first step of reading data packets from the recording medium, a second step of reading bandwidth information from the recording medium, step of extracting time information from the data packets having been read at the first reading step, a step of calculating times stamps corresponding to all the data packets on the basis of the time information having been extracted at the extracting step, a step of generating transmission packets corresponding to the network of the data packets with the time stamps to them, a step of securing a bandwidth of the network on the basis of the bandwidth information having been read at the second reading step and a step of sending the transmission packets having been generated at the generating step to the other electronic device by utilizing the network bandwidth having been secured at the securing step.

In the first data stream processor, first data stream processing method, and program stored in the first program storage media according to the present invention, transmission packets supplied via a network and corresponding to the network are received, data packets corresponding to a predetermined data stream are extracted from the received transmission packets, and the extracted data packets are recorded into a recording medium. Also, information on a bandwidth shared by the transmission packets in the network is acquired, and the acquired bandwidth information is correlated with the data stream and recorded into the recording medium.

In the second data stream processor, second data stream processing method and program stored in the second program storage medium according to the present invention, data packets are read from a recording medium from which bandwidth information is also read. Also, time information is extracted from the read data packets, and time stamps corresponding to all the data packets are calculated based on the extracted time information. Further, transmission packets corresponding to a network of the data packets are generated with time stamps appended thereto, a bandwidth of the network is secured on the basis of the read bandwidth information, and the generated transmission packets are sent to any other electronic device by utilizing the secured network bandwidth.

BEST MODE FOR CARRYING OUT THE INVENTION

Figure 4:
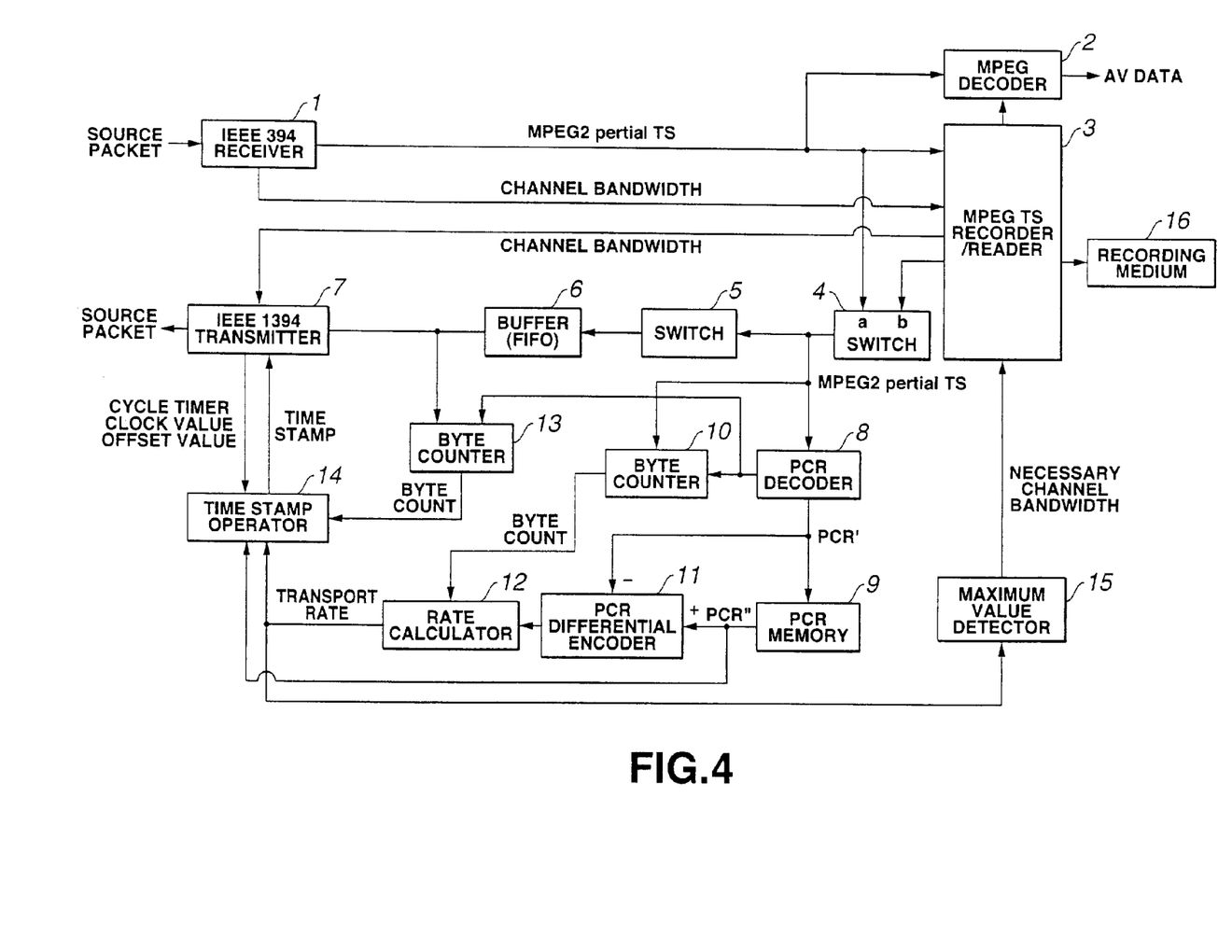
FIG. 4 is a block diagram of a recording/reproducing transmitter according to the present invention.

Referring now to FIG. 4, there is illustrated in the form of a block diagram a recording/reproducing transmitter, one of the embodiments of the present invention. The recording/reproducing transmitter restores an MPEG2 partial TS from a source packet (having MPEG2-TS packets forming an MPEG2 partial TS corresponding to one program as shown in FIG. 2) supplied via the IEEE 1394 serial data bus from a set top box (will be referred to as "STB" hereunder) or the like which receives CS digital broadcast data, records it into a recording medium (recording process), reads it and decodes it (reproducing process), or sends it to any other electronic device via the IEEE 1394 serial data bus (sending process).

The recording/reproducing transmitter includes an IEEE 1394 receiver 1. The IEEE 1394 receiver 1 is connected to a STB or the like via the IEEE 1394 serial data bus to analyze a source packet supplied, in the state as shown in FIG. 3C, from the STB, restore an PMEG2 partial TS as shown in FIG. 3D, and provides it to an MPEG decoder 2, MPEG TS recorder/reader 3 and a-terminal of a switch 4. The IEEE 1394 receiver 1 acquires information on a bandwidth of a channel via which the source packet has been received, and provides it to the MPEG TS recorder/reader 3.

The MPEG decoder 2 decodes the MPEG2 partial TS supplied from the IEEE 1394 receiver 1 or an MPEG2 partial TS having been read from a recording medium 16 by the MPEG TS recorder/reader 3, and provides an AV data thus acquired to an upstream (e.g., monitor). Note that since the MPEG2 partial TS from the IEEE 1394 receiver 1 has been entered at a timing so adjusted to generate neither overflow nor underflow at the MPEG decoder 2, it can be decoded accurately. Also note that since the MPEG2 partial TS from the MEPG TS recorder/reader 3 is read, for transfer, from the recording medium 16 by the MPEG TS recorder/reader 3 at a sufficiently high speed upon request from the MPEG decoder 2, it can be decoded accurately even if there is no recorded original timing.

In the recording process, the MPEG ST recorder/reader 3 records the MPEG2-TS packets forming together the MPGE2 partial TS supplied from the IEEE 1394 receiver 1 into the recording medium 16 consecutively irrespectively of the input timing, that is, with inter-packet spaces being removed. The MPEG TS recorder/reader 3 correlates the channel bandwidth information supplied from the IEEE 1394 receiver 1 with the recorded MPEG2 partial TS for recording into the recording medium 16, or correlates maximum transport rates of the MPEG2 partial TS to be recorded, supplied as necessary channel bandwidth information from a maximum value detector 15, to each other for recording into the recording medium 16.

Note that the channel bandwidth information or necessary channel bandwidth information may be recorded by recording packets having written therein the channel bandwidth information as user data of the MPEG TS after recording all MPEG2-TS packets forming together the MPEG2 partial TS.

Also, in the reproducing process, the MPEG TS recorder/reader 3 reads an MPEG2 partial TS from the recording medium 16 and provides it to the MPEG decoder 2. Further, in the sending process, the MPEG TS recorder/reader 3 reads an MPEG2 partial TS from the recording medium 16 and provides it to a b-terminal of the switch 4, and reads also channel bandwidth information recorded in correlation with the MPEG2 partial TS in the recording medium 17 and provides it to the IEEE 1394 transmitter 7.

The switch 4 selects either the MPEG2 partial TS supplied to the a-terminal thereof from the IEEE 1394 receiver 1 or the MPEG2 partial TS supplied to the b-terminal thereof from the MPEG TS recorder/reader 3 for delivery to a switch 5, PCR decoder 8 and a byte counter 10. Note that in the following, the MPEG2 partial TS supplied to the a-terminal from the IEEE 1394 receiver 1 will be referred to as "real-time MPEG2 partial TS" hereunder while the MPEG2 partial TS supplied to the b-terminal from the MPEG TS recorder/reader 3 will be referred to as "read MPEG2 partial TS" hereunder.

When the switch 4 is set to the b-terminal, the switch 5 provides a buffer 6 with the read MPEG2 partial TS supplied through the switch 4. On the other hand, when the switch 4 is set to the a-terminal, the switch 5 is ganged with the switch 4 to turned off. In this case, no input is made to the buffer 6.

The buffer 6 buffers the read MPEG2 partial TS supplied through the switch 4 or 5, adjusts its timing and delivers the MPEG2-TS packets one after another to the IEEE 1394 transmitter 7. The IEEE 1394 transmitter 7 appends a header having stored therein a time stamp supplied from a time stamp calculator 14 to each of the MPGE2-TS packets supplied one after another from the buffer 6 and forming the MPEG2 partial TS to generate source packets shown in FIG. 2, and sends the source packets to any other electronic device via the IEEE 1394 serial data bus.

The PCR decoder 8 detects and decodes a PCR packet included in the MPEG2 partial TS (real-time or read MPEG2 partial TS) supplied from the switch 4 to provide a PCR, and provides the PCR to a PCR memory 9 and PCR differential encoder 11. The PCR decoder 8 also provides information of the detection of the PCR packet to byte counters 10 and 13.

The PCR memory 9 will store only one PCR supplied from the PCR decoder 8. When the PCR memory 9 is supplied with a new PCR from the PCR decoder 8 (the new PCR will be referred to as PCR' hereunder), it provides the preceding PCR (will be referred to as PCR" hereunder) to the PCR differential encoder 11 and time stamp calculator 14, and then update the PCR' with stored data.

The byte counter 10 counts a space between PCR packets (data byte) included in the MPEG2 partial TS supplied from the switch 4, and provides a rate calculator 12 with a space from the top of a PCR packet corresponding to PCR' to a PCR packet corresponding to PCR" (the n-th packet is laid in the space) on the basis of the information of the PCR packet detection from the PCR decoder 8.

The PCR differential encoder 11 calculates a difference between PCR' supplied from the PCR decoder 8 and PCR" supplied from the PCR memory 9 (preceding PCR'), and provides it to the rate calculator 12. The rate calculator 12 calculates a transport rate of the MPEG2 partial TS supplied from the switch 4 to a downstream (transport_rate(n)) on the basis of a byte count of a space between the successive PCR' and PCR", supplied from the byte counter 10 (the n-th packet is laid in the space) and a difference between the successive PCR' and PCR", supplied from the PCR differential encoder 11, and provides it to the time stamp calculator 14 and maximum value detector 15.

The byte counter 13 counts data bytes of the MPEG2 partial TS supplied from the buffer 6 to the IEEE 1394 transmitter 7, and supplies, based on the information of PCR packet detection from the PCR decoder 8, data bytes included between the top of a PCR packet supplied immediately before to the IEEE 1394 transmitter 7 and the top of the n-th packet, as a byte count k-k" to the time stamp calculator 14 The time stamp calculator 14 generates time stamps corresponding to the n-th packet on the basis of a cycle timer clock (cycle_time(n)) and offset valve (cycle_offset(n)) supplied from the IEEE 1394 transmitter 7, transport rate (transport_rate(n)) supplied from the rate calculator 12, byte count (byte count (k-k")) supplied from the byte counter 13, and PCR" supplied from the PCR memory 9, and provides them to the IEEE 1394 transmitter 7.

When the switch 4 is set to the a-terminal, the maximum value detector 15 detects a maximum value of transport rates of the real-time MPEG2 partial TS supplied from the rate calculator 12, and provides it as a necessary channel bandwidth to the MPEG TS recorder/reader 3.

Next, the recording, reproducing and sending processes of the recorder/reproducing transmitter will be described.

First of all, the process of recording an MPEG2 partial TS supplied from a STB or the like via the IEEE 1394 serial data bus will be described herebelow with reference to the flow chart in FIG. 5.

Figure 5:
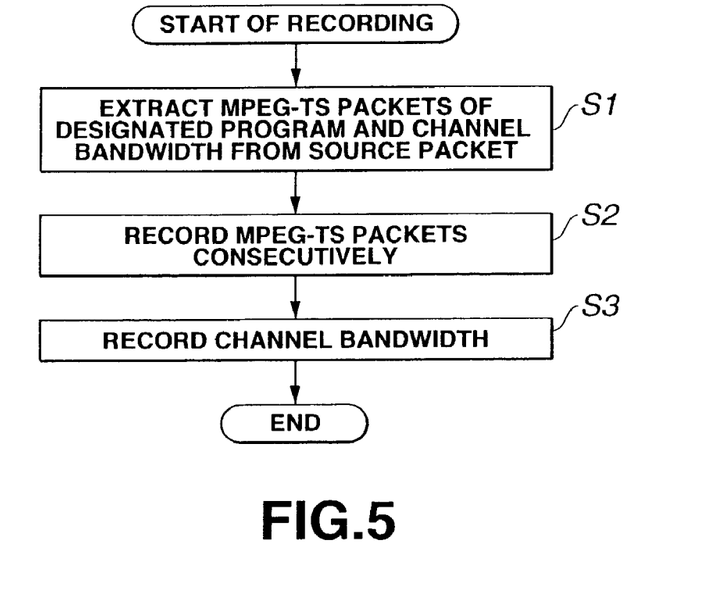
FIG. 5 is a flow chart of recording operations effected in the recording/reproducing transmitter.

At step S1 in the flow chart shown in FIG. 5, the IEEE 1394 receiver 1 analyzes the source packet supplied from the STB or the like via the IEEE 1394 serial data bus, restores the MPEG2 partial TS and provides it to the MPEG TS recorder/reader 3. The IEEE 1394 receiver 1 also acquires a bandwidth of a channel on which the source packet has been received, and provides it to the MPEG TS recorder/reader 3.

At step S2, the MPEG TS recorder/reader 3 removes the irregular spaces between the MPEG2 partial TS packets supplied from the IEEE 1394 receiver 1, that is, between MPEG2-TS packets as shown in FIG. 3D, and records the MPEG2-TS packets into the recording medium 16.

At step S3, the MPEG TS recorder/reader 3 correlates the channel bandwidth information supplied from the IEEE 1394 receiver 1 with the recorded MPEG2 partial TS, and records it into the recording medium 16.

As having been described in the above, the recording/reproducing transmitter according to the present invention does record the time stamps stated in the source packet header but removes the space between the MPEG2-TS packets forming together the MPEG2 partial TS for recording into the recording medium 16, in the recording procedure. So, the capacity of the recording medium 16 can be saved for the removed inter-packets spaces.

Note that in case necessary channel bandwidth information from the maximum value detector 15 is recorded instead of the channel bandwidth information, the switch 4 is set to the a-terminal for supplying the real-time MPEG partial TS supplied from the IEEE 1394 receiver 1 to the PCR decoder 8 and byte counter 10, a maximum value of the transport rates of the real-time MPEG2 partial TS, calculated by the rate calculator 12, is detected by the maximum valve detector 15 and supplied as a necessary channel bandwidth to the MPEG TS recorder/reader 3. Also note that since the switch 5 is turned off at this time, the real-time MPEG partial TS will not be sent via the IEEE 1394 serial data bus.

Next, the reproducing process will be described herebelow. The recording/reproducing transmitter according to the present invention is adapted to make real-time reproduction and reading/reproduction.

In the real-time reproducing process, the MPEG2 partial TS from the IEEE 1394 receiver 1 is decoded by the MPEG decoder 2. In this case, the MPEG 2 partial TS supplied to the MPEG decoder 2 is accurately decoded since its time has been adjusted by the IEEE 1394 receiver 1 as having been described in the above.

In the reading/reproducing process, the MPEG2 partial TS read by the MPEG TS recorder/reader 3 from the recording medium 16 is decoded by the MPEG decoder 2. In this case, the MPEG decoder 2 makes a request the MPEG TS recorder/reader 3 for transfer of MPEG-TS packets, and the MPEG TS recorder/reader 3 reads the MPEG-TS packets from the recording medium 16 at a sufficiently high speed upon the request. Thus, the MPEG partial TS is decoded accurately.

Figure 6:
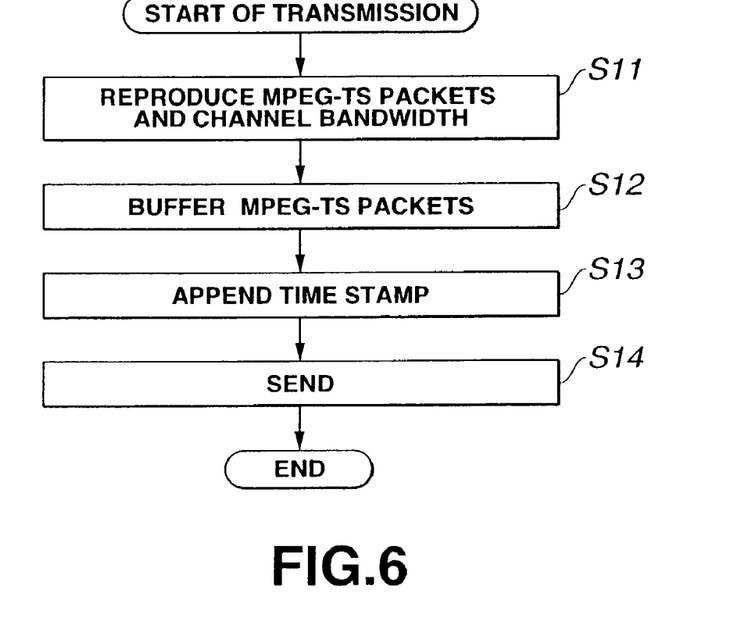
FIG. 6 is a flow chart of sending operations effected in the recording/reproducing transmitter.

Next, the process of reading the MPEG2 partial TS from the recording medium 16 and sending it to any other electronic device via the IEEE 1394 serial data bus, will be described below with reference to the flow chart shown in FIG. 6. Note that it is assumed that the recording medium 16 has relevant channel bandwidth information recorded therein.

At step S11, the MPEG TS recorder/reader 3 reads the MPEG2 partial TS from the recording medium 16 and delivers it at the b-terminal of the switch 4. Namely, it reads the relevant channel bandwidth information from the recording medium 16 and provides it to the IEEE 1394 transmitter 7.

At step S12, the IEEE 1394 transmitter 7 secures a bandwidth of the IEEE 1394 serial data bus on the basis of the channel bandwidth information supplied from the MPEG TS recorder/reader 3.

The switch 4 is set to the b-terminal, and the switch 5 is interlocked with the switch 4 to turn on. Thus, the read MPEG2 partial TS supplied from the MPEG TS recorder/reader 3 is buffered into the buffer 6 and also supplied to the PCR decoder 8 and byte counter 10.

The generation of time stamps, effected while the MPEG2-TS packets forming together the MPEG2 partial TS are being buffered in the buffer 6, will be described below. Before proceeding to the further description, there will be described the calculation of an arrival time t(i) of an MPEG-TS data byte (whose index number is i) as specified in ISO-13818 which standardizes the MPEG2 system stream, to be effected in the MPEG2 decoder (installed in a destination electronic device). The arrival time t(i) is given by the following expression (1):

$$t(i)=(PCR(i'')/\text{system\_clock\_frequency})+((i-i'')/\text{transport\_rate}(i)) \quad (1)$$

where i'' is an index number of a data byte including the last bit of program_clock_reference_base of a PCR just before the data byte whose index number is i, and PCR(i'') is a PCR included in the data byte whose index number is i'' and also a system clock time decoded with program_clock_reference_base and program_clock_$_{reference}$_extension.

In the expression (1) above, transport_rate(i) is given by the following expression (2):

$$\text{transport\_rate}(i)=\text{system\_clock\_frequency}\cdot(i-i'')/(PCR(i')-PCR(i'')) \quad (2)$$

where i'' is an index number of data byte including the last bit of program_clock_reference_base just before the data byte whose index number is i. Thus, the index numbers i, i'' and i'' are in a relation of i''$<$i$\leq$i'.

Therefore, by decoding PCR from the PCR packets included in the read MPEG2 partial TS and adapting it to the expressions (1) and (2), it is possible to time each of the MPEG2-TS packets forming together the MPEG2 partial TS.

However, the timing thus generated is likely to be different from that of each of the MPEG2-TS packets forming together the original MPEG2 partial TS (supplied from the IEEE 1394 receiver 1). Since the MPEG2 partial TS composed of the MPEG2-TS packets each timed as in the above conforms to the MPEG2 system stream standard, however, it will not overflow or underflow the STD buffer of the MPEG2 decoder installed in the destination electronic device so long as the original MPEG2 partial TS is accurately timed.

Next, the calculation of a time stamp consisting of cycle_count(n) and cycle_offset(n), stored in the n-th source packet header will be described. The cycle_count(n) and cycle_offset(n) are given by the following expressions (3) and (4):

$$\text{cycle\_count}(n)=(\text{cycle\_time}(n)/3072 \bmod 8000 \quad (3)$$

$$\text{cycle\_offset}(n)=(\text{cycle\_time}(n) \bmod 3072 \quad (4)$$

where mod is an operator for determination of a remainder.
Note that:

$$\text{cycle\_time}(n)=(T(n)*24576000)-\text{Offset}) \quad (5)$$

$$\text{Offset}=\text{cycle\_time}(0)-T(0)+\text{Overall Delay} \quad (6)$$

where cycle_time(0) is a clock value of a cycle timer for transmission of the top packet of the MPEG2 partial TS, T(0) is a time of the top packet of the MPEG2 partial TS, Overall Delay is a transmission delay on the IEEE 1394 serial data bus and a time (fixed with respect to sequence) taken for smoothing in the buffer 6.

The cycle_time(n) is uniquely determined based on the PCR. In an actual transmission, the Overall Delay is added to the clock value of the cycle timer incorporated in the IEEE 1394 transmitter 7 for transmission of the first packet. For transmission of the second and subsequent packets, the same Offset may be added to the clock value.

The arrival time T(m) of the n-th packet is given by the following expression (7) to which the expression (1) is applied:

$$T(n)=t(k)=(PCR(k'')/\text{system\_clock\_frequency})+(k-k'')/\text{transport}_{\_rate}(k)) \quad (7)$$

where k is an index number of the first byte of the n-th packet, k'' is an index number of a data byte including the last bit of the program_clock_reference_base of a PCR just before the n-th packet, and PCR(k'') is a PCR just before the n-th packet. The transport_rate(k) is given by the following expression (8) to which the expression (2) is applied:

$$\text{transport\_rate}(k)=\text{system\_clock\_frequency}\cdot(k'-k'')/PCR(k')-PCR(k'')) \quad (8)$$

where k' is an index number of a data byte including the last bit of program_clock_reference_base of a PCR just after the (n+1)-th packet.

Thus, the index numbers k, k' and k'' are in a relation of k''$<$k$\leq$k'.

Further description will be made with reference to FIG. 6 again. The time stamp calculator 14 generates time stamps as having previously been described. To generate a time stamp for the n-th packet, however, a PCR just after the n-th packet (=PCR') is necessary. Therefore, the buffer 6 buffers packets included between a PCR just before the n-th packet (=PCR'') and a PCR packet having PCR' stored therein for a period up to a time when the latter is supplied.

At step S13, the IEEE 1394 transmitter 7 appends a header having stored therein a time stamp supplied from the time stamp calculator 14 to each of the MPEG2-TS packets forming together the MPEG2 partial TS, supplied one after another from the buffer 6 to generate a source packet as shown in FIG. 2. At step S14, the IEEE 1394 transmitter 7 sends the source packet to any other electronic device via the IEEE 1394 serial data bus having been secured at step S2.

As having been described in the above, the recording/reproducing transmitter according to the present invention can decode a PCR from the MPEG2 partial TS recorded in the recording medium 16 and generate a time stamp for the source packet based on the PCR.

Figure 7:
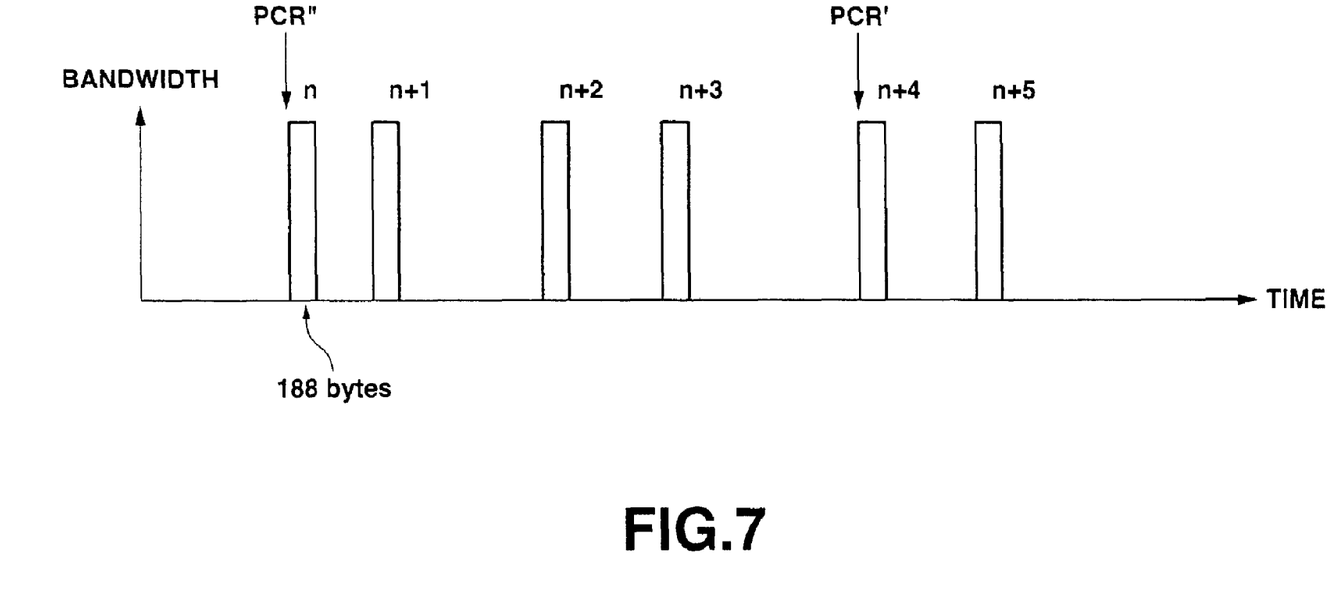
FIG. 7 explains an MPEG2 partial TS supplied from an IEEE 1394 receiver.

The MPEG2 partial TS supplied to the IEEE 1394 receiver 1 and the MPEG2 partial TS sent by the IEEE 1394 transmitter 7 will be compared herebelow with each other. As shown in FIG. 7, the MPEG2 partial TS supplied to the IEEE 1394 receiver 1 includes irregularly spaced packets and the packets has to be sent at the same rate. For transmission of the packets on the IEEE 1394 serial data bus, the same channel bandwidth as for the original MPEG2-TS (in which a plurality of programs such as broadcast signals is multiplexed) is required.

Figure 8:
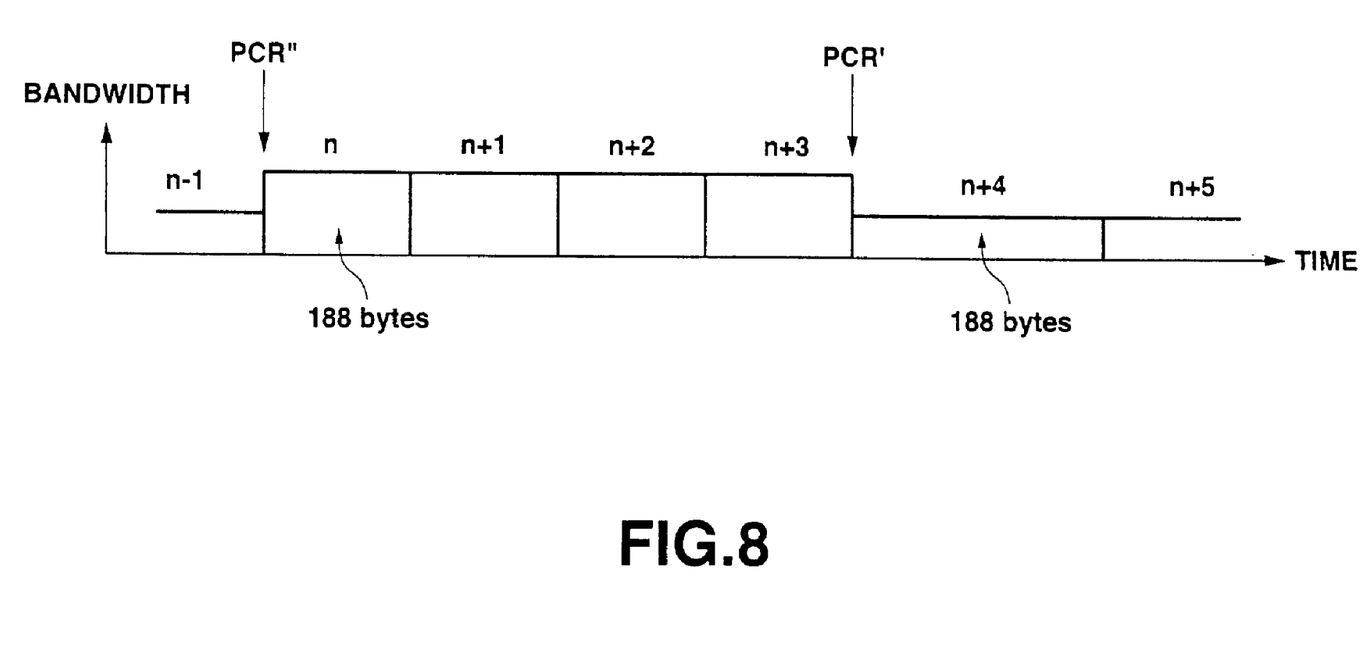
FIG. 8 explains an MPEG2 partial TS sent by an IEEE 1394 transmitter.

On the other hand, the MPEG2 partial TS to be sent by the IEEE 1394 transmitter 7 can be sent on the IEEE 1394 serial data bus with a narrower bandwidth than for the original MPEG2-TS since as shown in FIG. 8, the transport rate is different in one of two successive PCRs (for example, PCR" and PCR') from in the other PCR but the data rate of the packets in a PCR (n-th and (n+3)-th packets in this case) is constant.

For the effective utilization of the above characteristic, the necessary channel bandwidth information supplied from the maximum value detector 15 should be recorded into the recording medium 16 instead of the channel bandwidth information for the recorded MPEG2 partial TS in the recording process.

In the reproducing process to be done incase the necessary channel bandwidth information is recorded in the recording medium 16, no necessary channel bandwidth is supplied from the MPEG TS recorder/reader 3 to the IEEE 1394 transmitter 7, and so the IEEE 1394 transmitter 7 secure a bandwidth on the IEEE 1394 serial data bus on the basis of the necessary channel bandwidth information. Therefore, when the necessary channel bandwidth (maximum transport rate) is narrower than the channel bandwidth supplied from the IEEE 1394 receiver 1, it is possible to inhibit secureness of an excess bandwidth on the IEEE 1394 serial data bus.

In the foregoing, the present invention has been described concerning the embodiment AV data encoded by the MPEG2 method is sent on the IEEE 1394 serial data bus. Note however that the present invention is also applicable to a transmission of data encoded by any selected other method on any selected data bus or network.

Note that the aforementioned series of operations can be effected by a hardware and also by a software. For effecting the operations by a software, programs forming the software can be installed in a computer incorporated in a dedicated hardware or various programs can be installed in a general-purpose personal computer or the like capable of performing various functions, from a program recording medium.

Figure 9:
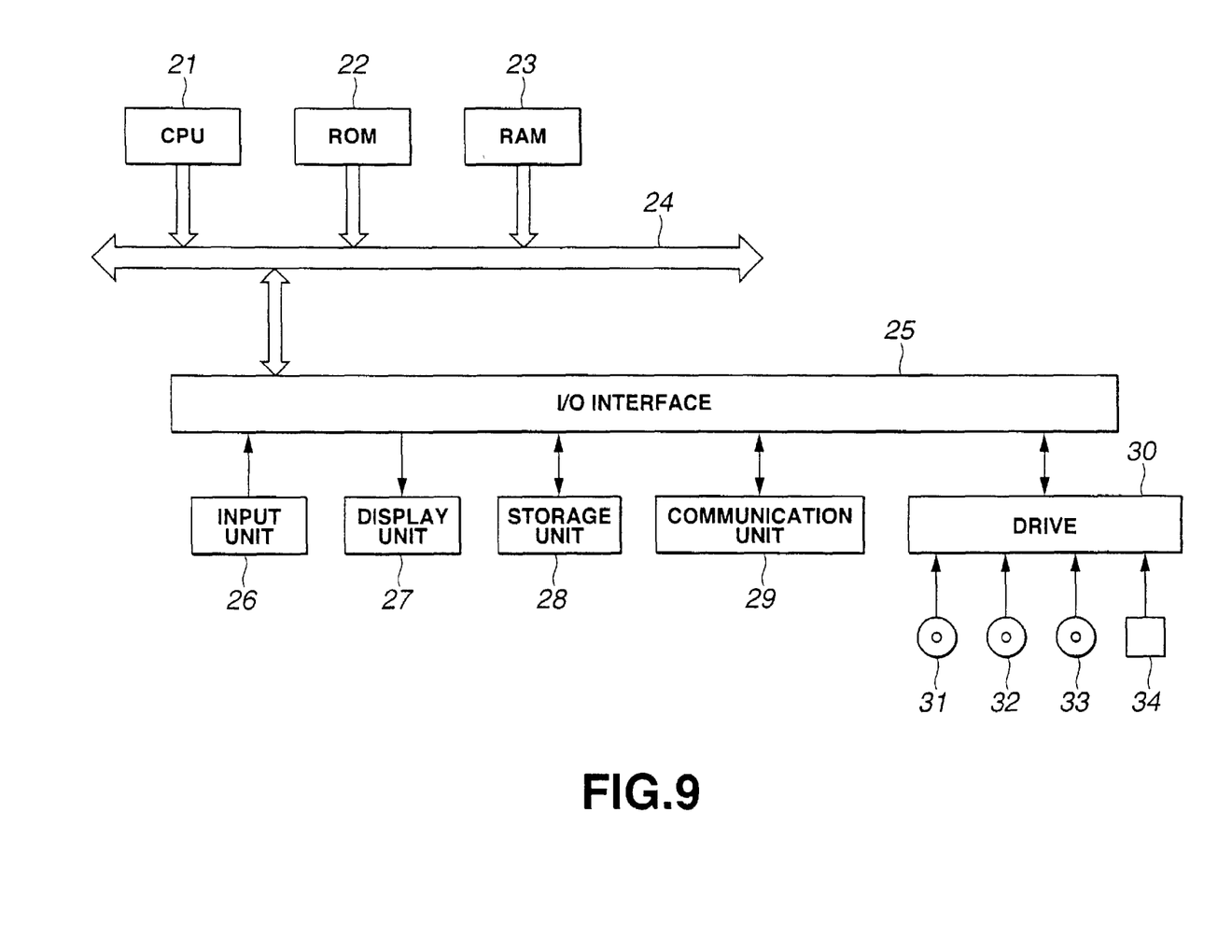
FIG. 9 is a block diagram of a general-purpose personal computer.

Referring now to FIG. 9, there is illustrated in the form of a block diagram an example construction of a general-purpose personal computer. The personal computer incorporates a CPU (central processing unit) 21 to which an input/output interface 25 is connected via a bus 24. The input/output interface 25 has connected thereto an input unit 26 consisting of input devices such as a keyboard, mouse, etc., a display unit 27 to display reproduced video, a memory unit 28 consisting of a hard disc drive etc. to store MPEG2 partial TS, channel bandwidth, necessary channel bandwidth and programs, a communication unit 29 corresponding to the IEEE 1394 receiver 1 and IEEE 1394 transmitter 7, and a drive 30 to read and write data from and to the program storage medium. The bus 24 has a ROM (read-only memory) 22 and RAM (random-access memory) 23.

The program storage medium to store programs includes a magnetic disc 31 (including a floppy disc), a packet medium including an optical disc (CD-ROM (compact disc read-only memory) 32, a DVD (digital versatile disc), magneto-optical disc 33 (including mini disc) or a semiconductor memory 34, which is distributed to each user for serving programs and having the programs therein, or a ROM or hard disc in which programs are stored provisionally or permanently, recorded therein. The programs are stored into the program storage medium by the use of a cable or radio communication medium such as a local area network, Internet or digital satellite broadcasting via an interface such as router, modem or the like as necessary.

The programs allowing the personal computer to effect the aforementioned operations are supplied to the personal computer from the program storage medium, read by the drive 30 and installed into a hard disc drive incorporated in the memory unit 28. The programs thus installed in the memory unit 28 are loaded from the memory unit 28 to the RAM 23 and then executed, under the control of the CPU 21 which operates in response to a user command supplied to the input unit 26.

Note that in this specification, the step of stating a program stored in the program storage medium includes of course the operation effected in a time sequence according to a specified procedure as well as operations which are not always effected in any time sequence but in parallel or individually.

Also, the term "system" used in this specification refers to an assembly of a plurality of devices.

INDUSTRIAL APPLICABILITY

As described above, in the first data stream processor, first data stream processing method, and program stored in the first program storage media according to the present invention, transmission packets supplied via a network and corresponding to the network are received, data packets corresponding to a predetermined data stream are extracted from the received transmission packets, and the extracted data packets are recorded into a recording medium. Also, information on a bandwidth shared by the transmission packets in the network is acquired, and the acquired bandwidth information is correlated with the data stream and recorded into the recording medium. Thus, it is possible to record the data stream that can be transmitted by being restored in the recording medium with its capacity being saved.

Also, in the second data stream processor, second data stream processing method and program stored in the second program storage medium according to the present invention, data packets are read from a recording medium from which bandwidth information is also read. Also, time information is extracted from the read data packets, and time stamps corresponding to all the data packets are calculated based on the extracted time information. Further, transmission packets corresponding to a network of the data packets are generated with time stamps appended thereto, a bandwidth of the network is secured on the basis of the read bandwidth information. Thus, it is possible to restore the data stream recorded in the recording medium and send it any other electronic device by utilizing the secured network bandwidth.

The invention claimed is:

1. A data stream processor which records a data stream supplied via a network, in which time information is inserted within a predetermined time, the processor comprising:
   means for receiving the data stream to which a time stamp is added per each packet;
   a first means for recording the data packets into which the time stamp has been removed from transmission packets including the data stream into a predetermined recording medium;
   means for extracting time information by detecting a packet into which time information is inserted from the data packets having been recorded to the recording medium;
   means for calculating time stamps corresponding to all the data packets, respectively, on the basis of the time information having been extracted by the time information extracting means;
   means for generating transmission packets corresponding to the network of the data packets with the time stamps appended thereto;
   means for securing a bandwidth of the network on the basis of the bandwidth information having been recorded to the recording medium; and
   means for sending the transmission packets having been generated by the generating means to another electronic device by utilizing the network bandwidth having been secured by the securing means.

2. A data stream processor which records a data stream supplied via a network, in which time information is inserted within a predetermined time, the processor comprising:
   means for receiving the data stream to which a time stamp is added per each packet;
   means for extracting a partial data stream corresponding to a predetermined program from the data stream into which a plurality of programs have been time-division multiplexed having been received by the receiving means;
   a first means for recording the data packets into which the time stamp has been removed from transmission packets including the partial data stream corresponding to the predetermined program into a predetermined recording medium;
   a first means for reading data packets recorded in said recording medium;
   means for extracting time information by detecting a packet into which time information is inserted from the data packets having been read by the first reading means;
   means for calculating time stamps corresponding to all the data packets, respectively, on the basis of the time information having been extracted by the time information extracting means;
   means for generating transmission packets corresponding to the network of the data packets with the time stamps appended thereto;
   a second means for reading bandwidth information recorded in said recording medium;
   means for securing a bandwidth of the network on the basis of the bandwidth information having been read by the second reading means; and
   means for sending the transmission packets having been generated by the generating means to another electronic device by utilizing the network bandwidth having been secured by the securing means.

3. The processor according to claim 2, further comprising:
   means for detecting the maximum value of a transport rate of the partial data stream; and
   a second means for correlating the maximum value of the transport rate with the partial stream as bandwidth information and recording it into the recording medium.

4. The processor according to claim 2, wherein the network is an IEEE 1394 serial data bus, the data stream is an MPEG2 transport stream, the transmission packets are source packets, and the partial data stream is an MPEG2 partial transport stream.

5. The processor according to claim 2, wherein the calculating means correlates time stamps with even time sections of a period between one piece of information and a next piece of information.

6. A data stream method for recording a data stream supplied via a network, in which time information is inserted within a predetermined time, the method comprising:
   receiving the data stream to which a time stamp is added per packet;
   extracting a partial data stream from the received data corresponding to a predetermined program from the data stream into which a plurality of programs have been time-division multiplexed;
   recording the data packets into which the time stamp has been removed from transmission packets including the partial data stream corresponding to the predetermined program into a predetermined recording medium;
   detecting the maximum value of a transport rate of the partial data stream;
   correlating the maximum value of the transport rate with the partial stream as bandwidth information and recording it into the recording medium;
   generating transmission packets corresponding to the network of the data packets with the time stamps appended thereto;
   reading bandwidth information recorded in said recording medium;
   securing a bandwidth of the network on the basis of the bandwidth information; and
   sending the generated transmission packets to another electronic device by utilizing the secured network bandwidth.

7. A computer readable storage medium encoded with computer program instructions which cause a computer to implement a method of data stream processing, the method comprising:
   receiving the data stream to which a time stamp is added per each packet;
   extracting a partial data stream from the received data corresponding to a predetermined program from the data stream into which a plurality of programs have been time-division multiplexed;
   recording the data packets into which the time stamp has been removed from transmission packets including the partial data stream corresponding to the predetermined program into a predetermined recording medium;
   detecting the maximum value of a transport rate of the partial data stream;
   correlating the maximum value of the transport rate with the partial stream as bandwidth information and recording it into the recording medium;

generating transmission packets corresponding to the network of the data packets with the time stamps appended thereto;
reading bandwidth information recorded in said recording medium;
securing a bandwidth of the network on the basis of the bandwidth information; and
sending the generated transmission packets to another electronic device by utilizing the secured network bandwidth.

8. A data stream processor which reads a data stream from a recording medium and sends it to another electronic device via a network, the processor comprising:
   means for reading data packets including the data stream from the recording medium;
   means for extracting time information by detecting a packet into which time information is inserted from the data packets having been read by the means for reading;
   means for calculating time stamps corresponding to all the data packets, respectively, on the basis of the time information having been extracted;
   means for generating transmission packets corresponding to the network of the data packets with the time stamps appended thereto;
   means for reading bandwidth information recorded in said recording medium;
   means for securing a bandwidth of the network on the basis of the bandwidth information; and
   means for sending the generated transmission packets to another electronic device by utilizing the secured network bandwidth.

9. The processor according to claim 8, wherein the calculating means correlates time stamps with even time sections of a period between one piece of information and a next piece of information.

10. The processor according to claim 8, wherein the calculating means calculates a time stamp to which delay time is added on the basis of a cycle timer for transmission.

11. The processor according to claim 8, wherein the network is an IEEE 1394 serial data bus, and wherein the transmission packets are source packets.

12. The processor according to claim 8, wherein the data stream is an MPEG2 transport stream.

13. A data stream processing method for use in a data stream processor to read a data stream from a recording medium and send it to another electronic device via a network, the method comprising:
   reading data packets including the data stream from the recording medium;
   extracting time information by detecting a packet into which time information is inserted from the data packets having been read from the recording medium;
   calculating time stamps corresponding to all the data packets, respectively, on the basis of the extracted time information;
   generating transmission packets corresponding to the network of the data packets with the time stamps appended thereto;
   reading bandwidth information recorded in the recording medium;
   securing a bandwidth of the network on the basis of the bandwidth information; and
   a step of sending the generated transmission packets to another electronic device by utilizing the secured network bandwidth.

14. A computer readable storage medium including computer program instructions which cause a computer to implement a method of a data stream processing under which a data stream is read from a recording medium and sent to another electronic device via a network, the program comprising:
   reading data packets including the data stream from the recording medium;
   extracting time information by detecting a packet into which time information is inserted from the data packets having been read from the recording medium;
   calculating time stamps corresponding to all the data packets, respectively, on the basis of the extracted time information;
   generating transmission packets corresponding to the network of the data packets with the time stamps appended thereto;
   reading bandwidth information recorded in the recording medium;
   securing a bandwidth of the network on the basis of the bandwidth information; and
   a step of sending the generated transmission packets to another electronic device by utilizing the secured network bandwidth.

15. A data stream processor for recording a data stream supplied via a network, in which time information is inserted within a predetermined time, the processor comprising:
   an interface configured to receive the data stream to which a time stamp is added per each packet;
   a recording unit configured to record the data packets into which the time stamp has been removed from transmission packets including the data stream into a predetermined recording medium;
   an extraction unit configured to extract time information be detecting a packet into which time information is inserted from the data packets having been read from said recording medium;
   a calculation unit configured to calculate time stamps corresponding to all the data packets, respectively, on the basis of the extracted time information;
   a generating unit configured to generate transmission packets corresponding to the network of the data packets within the time stamps appended thereto;
   a securing unit configured to secure a bandwidth of the network on the basis of the bandwidth information read from said recording medium; and
   a transmission unit configured to send the generated transmission packets to another electronic device by utilizing the secured network bandwidth.

* * * * *